(12) United States Patent
Zhong et al.

(10) Patent No.: US 10,914,988 B2
(45) Date of Patent: Feb. 9, 2021

(54) VERTICAL ALIGNMENT LIQUID CRYSTAL DISPLAY AND MANUFACTURE METHOD THEREOF

(71) Applicant: Shenzhen China Star Optoelectronics Technology Co., Ltd., Guangdong (CN)

(72) Inventors: Xinhui Zhong, Guangdong (CN); Yungjui Lee, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 224 days.

(21) Appl. No.: 16/128,733

(22) Filed: Sep. 12, 2018

(65) Prior Publication Data

US 2019/0023988 A1     Jan. 24, 2019

Related U.S. Application Data

(62) Division of application No. 14/423,696, filed on Feb. 24, 2015, now Pat. No. 10,113,117.

(51) Int. Cl.
*G02F 1/1337*     (2006.01)
*C09K 19/30*     (2006.01)
(Continued)

(52) U.S. Cl.
CPC ........ *G02F 1/1337* (2013.01); *C09K 19/3028* (2013.01); *C09K 19/56* (2013.01);
(Continued)

(58) Field of Classification Search
CPC ............... C09K 19/3028; C09K 19/56; C09K 2019/0448; C09K 2019/2078;
(Continued)

(56) References Cited

U.S. PATENT DOCUMENTS

| 2009/0244461 A1* | 10/2009 | Rho ................. G02F 1/133753 349/129 |
| 2010/0033662 A1* | 2/2010 | Lee ......................... G02F 1/137 349/123 |

(Continued)

FOREIGN PATENT DOCUMENTS

WO    WO-2013004372 A1 *   1/2013 ............. C09K 19/56

*Primary Examiner* — Sophie Hon
(74) *Attorney, Agent, or Firm* — Leong C. Lei

(57) ABSTRACT

A vertical alignment liquid crystal display includes a first substrate, a second substrate, a liquid crystal layer located between the first substrate and the second substrate, a first and a second passivation layers respectively located at inner sides of the first and the second substrates, a common electrode layer and a pixel electrode layer respectively located on the first and the second passivation layers. The liquid crystal layer includes liquid crystal molecules, auxiliary alignment agent and a polymer network penetrating the entire liquid crystal layer. The auxiliary alignment agent makes the liquid crystal molecules in the liquid crystal layer vertically aligned on the surfaces of the first and the second substrates. The polymer network stabilizes alignment of the liquid crystal molecules and enhances vertical alignment effect of the auxiliary alignment agent to the liquid crystal molecules.

1 Claim, 6 Drawing Sheets

(51) Int. Cl.
    *G02F 1/137*     (2006.01)
    *G02F 1/139*     (2006.01)
    *C09K 19/56*     (2006.01)
    *C09K 19/04*     (2006.01)
    *C09K 19/20*     (2006.01)
    *C09K 19/54*     (2006.01)
    *G02F 1/1334*     (2006.01)

(52) U.S. Cl.
    CPC ............ *G02F 1/137* (2013.01); *G02F 1/1393* (2013.01); *G02F 1/133788* (2013.01); *C09K 2019/0448* (2013.01); *C09K 2019/2078* (2013.01); *C09K 2019/546* (2013.01); *C09K 2019/548* (2013.01); *C09K 2323/02* (2020.08); *G02F 2001/13345* (2013.01); *G02F 2001/13775* (2013.01); *G02F 2001/133742* (2013.01)

(58) Field of Classification Search
    CPC ........ C09K 2019/546; C09K 2019/548; C09K 2323/02; G02F 1/133788; G02F 1/1337; G02F 1/137; G02F 1/1393; G02F 2001/13345; G02F 2001/133742; G02F 2001/13775; Y10T 428/1005
    See application file for complete search history.

(56) References Cited

U.S. PATENT DOCUMENTS

| | | | |
|---|---|---|---|
| 2010/0149446 A1* | 6/2010 | Fujisawa | C09K 19/542<br>349/38 |
| 2014/0009377 A1* | 1/2014 | Shibazaki | G02F 1/1336<br>345/102 |
| 2014/0138581 A1* | 5/2014 | Archetti | C09K 19/0403<br>252/299.61 |
| 2017/0152442 A1* | 6/2017 | Lee | C09K 19/3098 |

* cited by examiner

VERTICAL ALIGNMENT LIQUID CRYSTAL DISPLAY AND MANUFACTURE METHOD THEREOF

CROSS REFERENCE TO RELATED APPLICATIONS

This is a divisional application of co-pending patent application Ser. No. 14/423,696, filed on Feb. 24, 2015, which is a national stage of PCT Application No. PCT/CN2015/072470, filed on Feb. 8, 2015, claiming foreign priority of Chinese Patent Application No. 201410677133.2, filed on Nov. 21, 2014.

FIELD OF THE INVENTION

The present invention relates to a display technology field, and more particularly to a vertical alignment liquid crystal display and a manufacture method thereof.

BACKGROUND OF THE INVENTION

The LCD (Liquid Crystal Display) possesses many advantages of being ultra thin, power saved and radiation free. It has been widely utilized in, such as LCD TVs, mobile phones, PDAs, digital cameras, laptop screens or notebook screens.

For the TFT-LCD panels in the present main market, three types can be illustrated, which respectively are Twisted Nematic/Super Twisted Nematic (TN/STN), In-Plane Switching (IPS) and Vertical Alignment (VA). The VA liquid crystal display possesses extremely high contrast than the liquid crystal displays of other types, which can reach up to 4000-8000 in general. It has very wide application in large scale display, such as television or etc.

The reason why the VA liquid crystal display possesses extremely high contrast is that the liquid crystal molecules are vertically aligned to the substrate surface, and no phase difference exists, and light leakage is very small at the dark state without applying electricity. The lower the brightness at the dark state can be, the higher the contrast is. As shown in FIG. 1, for vertically aligning the liquid crystal molecules in the VA liquid crystal display to the substrate surface, the liquid crystal molecules 300 require vertical alignment process. The most common method is to coat the alignment agent in specific districts at the inner surfaces of the upper substrate 100 and the lower substrate 200, and the alignment agent generally contains a mass of chemical solvents, N-methylpyrrolidone (NMP) and polymer material (Polyimide, PI). Then, the substrate is baked for a long time under high temperature (200 degree above in general) to cure the solvent in the alignment agent, and thus, to form the PI alignment layer 310 on the surfaces of the glass substrates.

For earning better wide view angle property for the VA liquid crystal display, the multi-domain VA (MVA) technology is commonly utilized, which is to divide a sub pixel into many districts and drive the liquid crystals in respective districts to lie down toward different directions as applying voltage. Thus, the watch results from respective directions can be equal. There are many ways to realize MVA technology. Please refer to FIGS. 2 and 3. One is to form a pozidriv slit pattern in an indium tin oxide (ITO) pixel electrode 800 at one side, and with the special ITO pixel electrode pattern, the tilt electric field can induce the liquid crystal molecules 300 to lay down toward different directions. FIG. 2 is a top view of one side of a lower substrate 200 in an MVA liquid crystal display according to prior art, wherein 210 and 220 are respectively scan lines and data lines. FIG. 3 is a sectional view of an MVA liquid crystal display according to the prior art, wherein 700 is a passivation layer of which the material is silicon nitride (SiNx). The MVA liquid crystal display has advantages of simple process, high contrast, high aperture ratio and short response time.

However, for realizing the VA alignment, the vertical alignment agent has to be coated on the substrate surface and high temperature baking process has to implement. Because the alignment agent contains a large amount of NMP solvent, the alignment layer formation process is a high energy consumptive, extremely non-environmental protective and human body harmful procedure; besides, due to the problems of non-uniformity, lack coating, non-stick and foreign matter of the alignment layer, the yield lost of the production can occur which results in source waste and increase of the production cost.

In consideration of the above factors, there is a need to develop the VA liquid crystal display in which the PI alignment layer is not needed. As shown in FIG. 4, by changing the recipe of the liquid crystal of adding substance of a sort of auxiliary alignment agent, the liquid crystal molecules 300 are made vertically aligned to a substrate surface of the liquid crystal display under a condition without alignment layers. Such a kind of auxiliary alignment agent does not need other solvent but can be directly dissolved in the liquid crystal and used with the liquid crystal together. The previous coating equipment and high temperature baking equipment of the alignment agent can be saved. Without the extra solvent, it is cleaner, more environmental protective and energy saved. The function mechanism of the auxiliary alignment agent 301 is that one end of molecules of the auxiliary alignment agent possesses special affinity with inorganic material of the substrate surface, such as silicon nitride constructing the passivation layer 700 or ITO constructing the pixel electrode 800, and can attach to the surfaces of the substrates, and the other end of molecules of the auxiliary alignment agent 301 has extremely strong acting force with the liquid crystal molecules 300, and thus, the liquid crystal molecules 300 can be induced to be vertical aligned with the surfaces of the substrates. Ultimately, the effect shown in FIG. 4 can be achieved.

Although the small molecule auxiliary alignment agent can realize the effect of vertical alignment, the aligning force and the anchoring energy of most of the small molecule auxiliary alignment agents are weak, and result in issues of poor uniformity in surface and low long-term reliability. Thus, there is a need to improve such kind of liquid crystal display of achieving vertical alignment without PI to enhance the aligning force and the anchoring energy to the liquid crystal molecules.

SUMMARY OF THE INVENTION

An objective of the present invention is to provide a vertical alignment liquid crystal display. The weaker alignment ability issue of the small molecule auxiliary alignment agent can be solved under the condition that the PI alignment layer is eliminated and the auxiliary alignment agent is employed for realizing the vertical alignment, to enhance the aligning force and the anchoring energy of the auxiliary alignment agent to the liquid crystal molecules and vertical alignment effect of the auxiliary alignment agent to the liquid crystal molecules.

Another objective of the present invention is to provide a manufacture method of a vertical alignment liquid crystal display, capable of solving the weaker alignment ability issue of the small molecule auxiliary alignment agent, to enhance the aligning force and the anchoring energy of the auxiliary alignment agent to the liquid crystal molecules and vertical alignment effect of the auxiliary alignment agent to the liquid crystal molecules and to be more environmental protective and save energy.

For realizing the aforesaid objective, the present invention provides a vertical alignment liquid crystal display, comprising a first substrate, a second substrate, oppositely located with the first substrate, a liquid crystal layer located between the first substrate and the second substrate, a first passivation layer and a second passivation layer respectively located at inner sides of the first substrate and the second substrate and a common electrode layer and a pixel electrode layer respectively located on the first passivation layer and the second passivation layer;

the liquid crystal layer comprises liquid crystal molecules, auxiliary alignment agent and a polymer network penetrating the entire liquid crystal layer; the auxiliary alignment agent makes the liquid crystal molecules in the liquid crystal layer vertically aligned on the first substrate and the second substrate; the polymer network stabilizes alignment of the liquid crystal molecules and enhances vertical alignment effect of the auxiliary alignment agent to the liquid crystal molecules.

The liquid crystal molecules are negative liquid crystal molecules; the polymer network is manufactured by polymerization of polymeric monomer after UV irradiation.

A weight percentage of the polymeric monomer in the liquid crystal layer is 0.5%~8%.

A weight percentage of the polymeric monomer in the liquid crystal layer is 1%~5%.

The polymeric monomer comprises at least one double polymerizable group monomer and at least one polymeric group compound; a weight percentage of the polymeric group compound in the polymerizable monomer is 10%-50%.

A constitutional formula of the double polymerizable group monomer is:

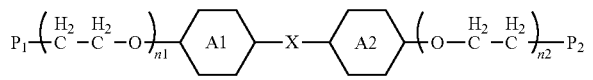

wherein P1 and P2 are polymeric groups, and the two are the same or different and selected from one of methylacrylate, acrylate, epoxy group, vinyl, n1 and n2 are integers of 0-5, and the two are the same or different, A1 and A2 are hexatomic rings, and the two are the same or different and comprise substituent group or do not comprise substituent group, and is benzene rings or cyclohexane.

X is linking group, which is alkyl, ether, ester group chain that main chain contains 1-20 molecules replaced or not replaced, or hexatomic ring, which contains 1-5 of directly linked or spaced alkyl, ether, ester group of chain replaced or not replaced;

a constitutional formula of the polymeric group compound is:

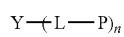

wherein Y is kernel atom or group, linking a plurality of substituent groups, which is carbon atom, nitride atom, phosphate radical, multi ring group replaced or not replaced, L is linking group, which is alkyl, ether, ester group chain that main chain contains 1-20 molecules replaced or not replaced;

P is polymeric group, selected from one of methylacrylate, acrylate, epoxy group, vinyl, and n is 3 or 4.

The present invention further provides a manufacture method of a vertical alignment liquid crystal display, comprising steps of:

step 1, loading a first substrate and a second substrate;

a first passivation layer and a second passivation layer are respectively located at inner sides of the first substrate and the second substrate, and a common electrode layer and a pixel electrode layer are respectively located on the first passivation layer and the second passivation layer;

step 2, coating a glue frame on the first substrate or the second substrate;

step 3, filling a liquid crystal layer in a district surrounded by the glue frame;

the liquid crystal layer comprises liquid crystal molecules, auxiliary alignment agent and polymeric monomer;

a weight percentage of the polymeric monomer in the liquid crystal layer is 0.5%-8%;

step 4, assembling the first substrate and the second substrate;

step 5, applying voltage to the common electrode layer and the pixel electrode layer to make the liquid crystal molecules in the liquid crystal layer twisted with a certain degree, and employing UV to irradiate the liquid crystal layer;

the polymeric monomer is occurred with polymerization to form a polymer network penetrating the entire liquid crystal layer.

A weight percentage of the polymeric monomer in the liquid crystal layer is 1%-5%, and the liquid crystal molecules are negative liquid crystal molecules.

The polymeric monomer comprises at least one double polymerizable group monomer and at least one polymeric group compound; a weight percentage of the polymeric group compound in the polymerizable monomer is 10%-50%.

A constitutional formula of the double polymerizable group monomer is:

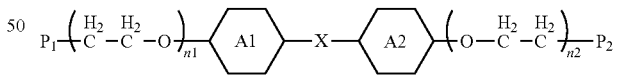

wherein P1 and P2 are polymeric groups, and the two are the same or different, and selected from one of methylacrylate, acrylate, epoxy group, vinyl, n1 and n2 are integers of 0-5, and the two are the same or different, A1 and A2 are hexatomic rings, and the two are the same or different, and comprise substituent group or do not comprise substituent group, and is benzene rings or cyclohexane.

X is linking group, which is alkyl, ether, ester group chain that main chain contains 1-20 molecules replaced or not replaced, or hexatomic ring, which contains 1-5 of directly linked or spaced alkyl, ether, ester group of chain replaced or not replaced;

a constitutional formula of the polymeric group compound is:

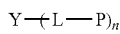

wherein Y is kernel atom or group, linking a plurality of substituent groups, which is carbon atom, nitride atom, phosphate radical, multi ring group replaced or not replaced, L is linking group, which is alkyl, ether, ester group chain that main chain contains 1-20 molecules replaced or not replaced;

P is polymeric group, selected from one of methylacrylate, acrylate, epoxy group, vinyl, and n is 3 or 4.

The present invention further provides a manufacture method of a vertical alignment liquid crystal display, comprising steps of:

step 1, loading a first substrate and a second substrate;

a first passivation layer and a second passivation layer are respectively located at inner sides of the first substrate and the second substrate, and a common electrode layer and a pixel electrode layer are respectively located on the first passivation layer and the second passivation layer;

step 2, coating a glue frame on the first substrate or the second substrate;

step 3, filling a liquid crystal layer in a district surrounded by the glue frame;

the liquid crystal layer comprises liquid crystal molecules, auxiliary alignment agent and polymeric monomer;

a weight percentage of the polymeric monomer in the liquid crystal layer is 0.5%-8%;

step 4, assembling the first substrate and the second substrate;

step 5, applying voltage to the common electrode layer and the pixel electrode layer to make the liquid crystal molecules in the liquid crystal layer twisted with a certain degree, and employing UV to irradiate the liquid crystal layer;

the polymeric monomer is occurred with polymerization to form a polymer network penetrating the entire liquid crystal layer;

wherein a weight percentage of the polymeric monomer in the liquid crystal layer is 1%-5%, and the liquid crystal molecules are negative liquid crystal molecules;

wherein the polymeric monomer comprises at least one double polymerizable group monomer and at least one polymeric group compound; a weight percentage of the polymeric group compound in the polymerizable monomer is 10%-50%.

The benefits of the present invention are as follows. The present invention provides a vertical alignment liquid crystal display, and the liquid crystal layer comprises liquid crystal molecules, auxiliary alignment agent and a polymer network penetrating the entire liquid crystal layer, and with the auxiliary alignment agent, the vertical alignment of the liquid crystal molecules can be achieved. The polymer network has an extremely large surface area, and an extremely large contact area with the liquid crystal molecules to stabilize alignment of the liquid crystal molecules and enhance vertical alignment effect of the auxiliary alignment agent to the liquid crystal molecules. Thus, the weaker alignment ability issue of the small molecule auxiliary alignment agent can be solved to enhance the aligning force and the anchoring energy of the auxiliary alignment agent to the liquid crystal molecules and vertical alignment effect of the auxiliary alignment agent to the liquid crystal molecules;

the present invention provides a manufacture method of a vertical alignment liquid crystal display, by filling the liquid crystal layer comprising liquid crystal molecules, auxiliary alignment agent and polymeric monomer, and applying voltage to the liquid crystal layer with UV irradiation to induce polymerization of polymeric monomer, a polymer network penetrating the entire liquid crystal layer with a extremely large surface area is formed. The polymer network has an extremely large surface area, and an extremely large contact area with the liquid crystal molecules to stabilize alignment of the liquid crystal molecules. Thus, the weaker alignment ability issue of the small molecule auxiliary alignment agent can be solved to enhance the aligning force and the anchoring energy of the auxiliary alignment agent to the liquid crystal molecules and vertical alignment effect of the auxiliary alignment agent to the liquid crystal molecules. The method is more environmental protective and saves energy.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
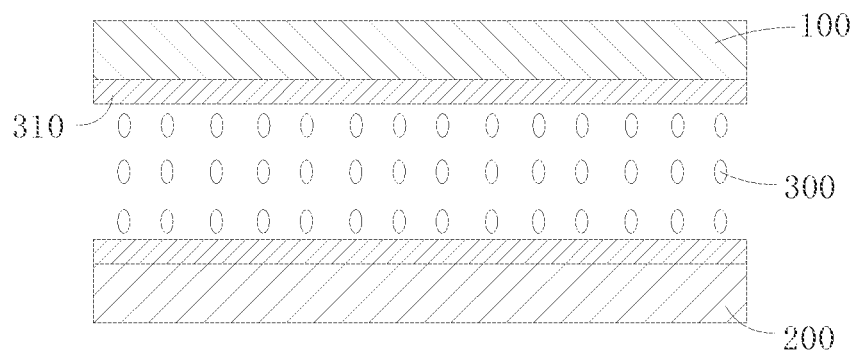
FIG. 1 is a sectional view of a vertical alignment liquid crystal display using alignment layers according to prior art.
Figure 2:
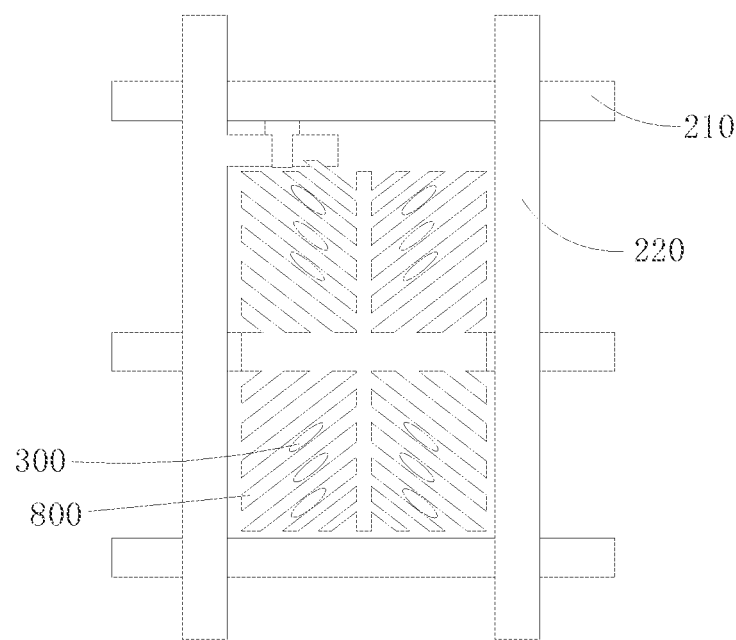
FIG. 2 is a top view of one side of a lower substrate in an MVA liquid crystal display using alignment layers according to prior art.
Figure 3:
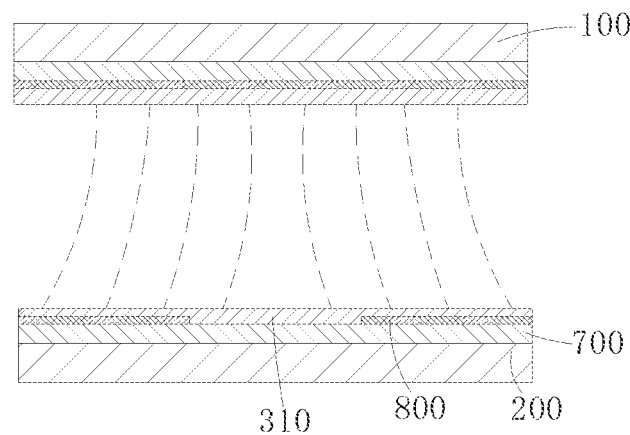
FIG. 3 is a sectional view of an MVA liquid crystal display using alignment layers according to prior art.
Figure 4:
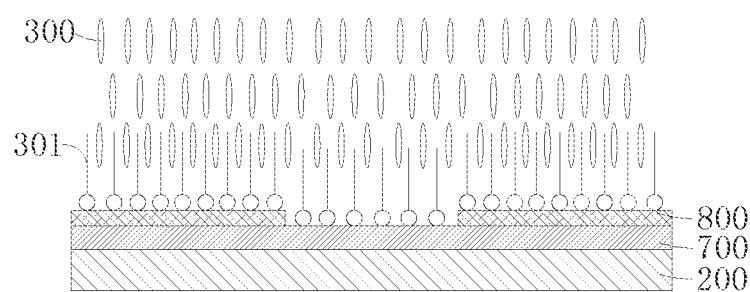
FIG. 4 is a sectional view of a vertical alignment liquid crystal display using auxiliary alignment agent according to prior art.
Figure 5:
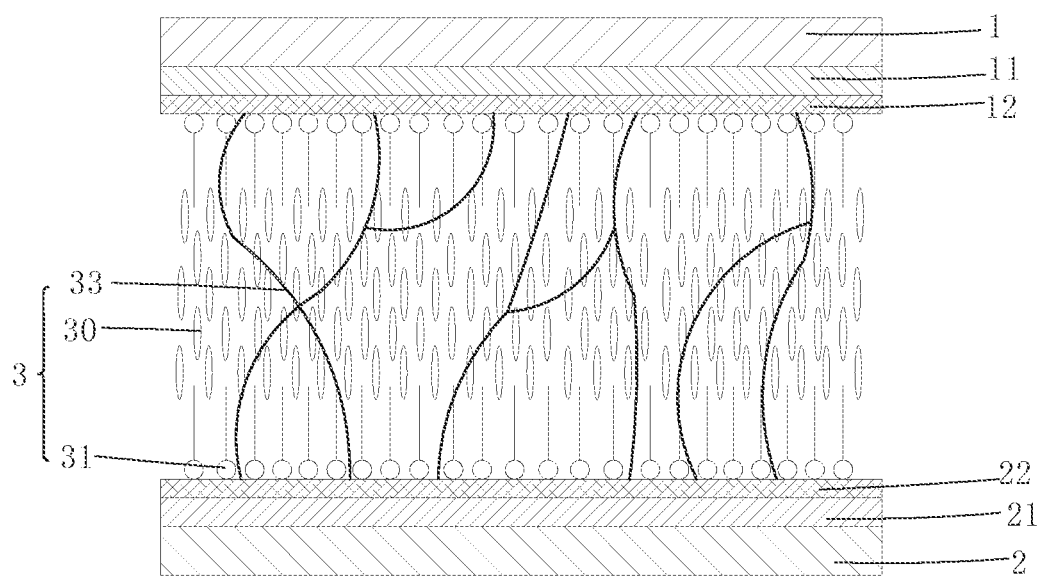
FIG. 5 is a sectional structure view of the vertical alignment liquid crystal display according to the present invention.
Figure 6:
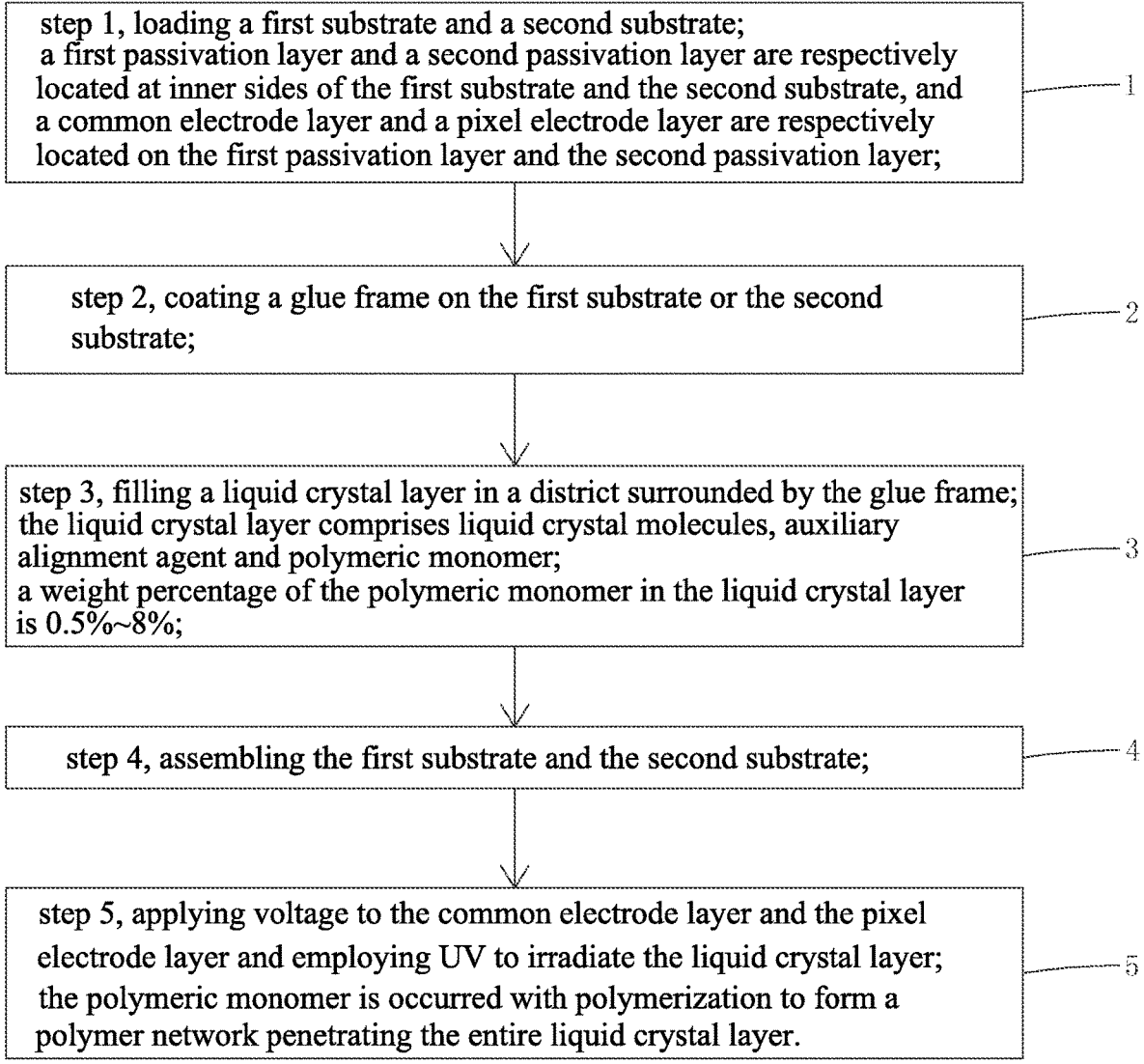
FIG. 6 is a flowchart of a manufacture method of the vertical alignment liquid crystal display according to the present invention.

Referring to FIG. 5, the present invention first provides a vertical alignment liquid crystal display, comprising a first substrate 1, a second substrate 2, oppositely located with the first substrate 1, a liquid crystal layer 3 located between the first substrate 1 and the second substrate 2, a first passivation layer 11 and a second passivation layer 21 respectively located at inner sides of the first substrate 1 and the second substrate 2 and a common electrode layer 12 and a pixel electrode layer 22 respectively located on the first passivation layer 11 and the second passivation layer 21.

The first substrate 1 comprises a black matrix, a color filter and photo spacers but not limited thereto. The first substrate 1 is equivalent to a CF substrate of the traditional liquid crystal display. The second substrate 2 comprises gate lines, scan lines, thin film transistors but not limited thereto. The second substrate 2 is equivalent to a TFT substrate of the traditional liquid crystal display. Materials of the common electrode layer 12 and the pixel electrode layer 22 are both ITO. A material of the first passivation layer 11 and a material of the second passivation layer 21 are silicon nitride.

The liquid crystal layer 3 comprises liquid crystal molecules 30, auxiliary alignment agent 31 and a polymer network 33 penetrating the entire liquid crystal layer 3 but not limited thereto. Furthermore, the liquid crystal molecules 30 are negative liquid crystal molecules. The vertical alignment liquid crystal display of the present invention does not use the PI alignment layer but the auxiliary alignment agent 31 in the liquid crystal layer 3 for achieving the vertical alignment of the liquid crystal molecules 30, to make the liquid crystal molecules 30 vertically aligned on the surfaces of the first and the second substrates 1, 2, and save consumption of the PI material and the investments for the related equipments of PI spray coating, baking. The tremendous consumed energy required in the PI pre-baking and high temperature post baking processes can be saved to prevent the damages to the environment and human body from the solvent evaporation in the PI processes.

The polymer network 33 has an extremely large surface area, and an extremely large contact area with the liquid crystal molecules 30 to stabilize alignment of the liquid crystal molecules 30 and enhance vertical alignment effect of the auxiliary alignment agent 31 to the liquid crystal molecules 30.

The polymer network 33 is manufactured by polymerization of UV light sensitive polymeric monomer after UV irradiation. A weight percentage of the polymeric monomer 32 in the liquid crystal layer 3 is 0.5%-8%, and preferably, the weight percentage of the polymeric monomer 32 in the liquid crystal layer 3 is 1%-5%. Specifically, the polymeric monomer comprises two or more compounds of methylacrylate, acrylate, epoxy group, vinyl, which comprises at least one double polymerizable group monomer and at least one polymeric group compound. A weight percentage of the polymeric group compound in the polymerizable monomer is 10%-50%.

The double polymerizable group monomer comprises two polymerizable groups, and the polymerizable group can be methylacrylate, acrylate, epoxy group or vinyl. The polymeric group compound comprises three or more polymerizable groups, and the polymerizable group can be methylacrylate, acrylate or epoxy group. The polymeric group compound comprises a plurality of polymerizable groups which can act as a crosslinking center in the polymerization for easily forming the polymer network 33.

Specifically, the double polymerizable group monomer comprises a constitutional formula of:

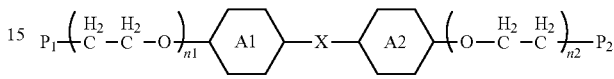

wherein P1 and P2 are polymeric groups, and the two can be the same or different and are selected as one of methylacrylate, acrylate, epoxy group, vinyl.

n1 and n2 are integers of 0-5, and the two can be the same or different.

A1 and A2 are hexatomic rings, and the two can be the same or different, and comprise substituent group or do not comprise substituent group, and can be benzene rings or cyclohexane.

X is linking group, which can be alkyl, ether, ester group chain that main chain contains 1-20 molecules replaced or not replaced, or hexatomic ring, which contains 1-5 of directly linked or spaced alkyl, ether, ester group of chain replaced or not replaced.

For instance, a constitutional formula of the double polymerizable group monomer can be:

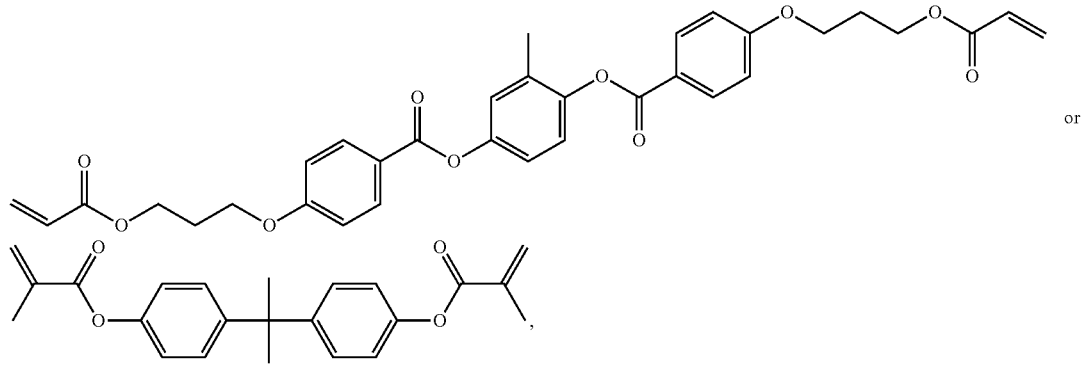

The polymeric group compound comprises a constitutional formula of:

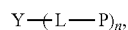

wherein Y is kernel atom or group, capable of linking a plurality of substituent groups, and L is linking group, and P is polymeric group, and n is 3 or 4.

Y can be carbon atom, nitride atom, phosphate radical, multi ring group replaced or not replaced; L is alkyl, ether, ester group chain that main chain contains 1-20 molecules replaced or not replaced; P is selected from one of methylacrylate, acrylate, epoxy group, vinyl.

For instance, a specific constitutional formula of the polymeric group compound can be:

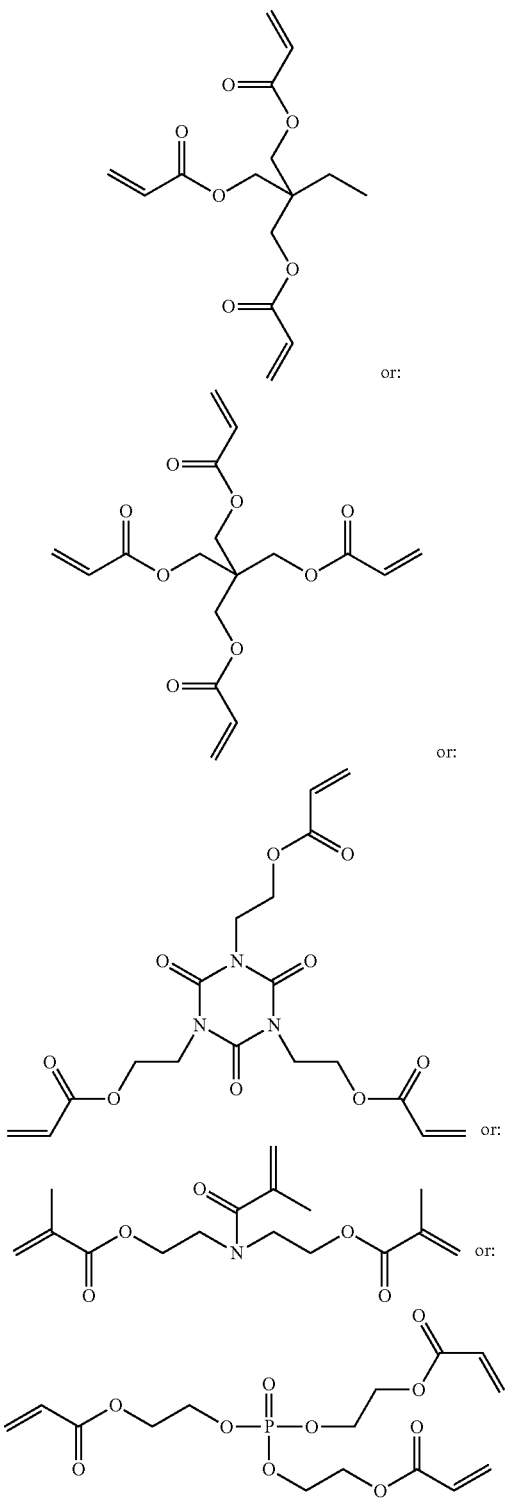

Referring to FIGS. 6-10, the present invention further provides a manufacture method of the vertical alignment liquid crystal display, comprising steps of:

step 1, loading a first substrate 1 and a second substrate 2.

Figure 7:
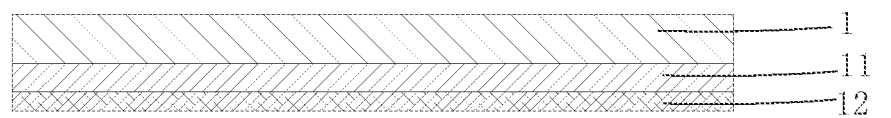
FIG. 7 is a view showing step 1 of the manufacture method of the vertical alignment liquid crystal display according to the present invention.

As shown in FIG. 7, a first passivation layer 11 and a second passivation layer 21 are respectively located at inner sides of the first substrate 1 and the second substrate 2, and a common electrode layer 12 and a pixel electrode layer 22 are respectively located on the first passivation layer 11 and the second passivation layer 21.

The first substrate 1 comprises a black matrix, a color filter and photo spacers but not limited thereto. The first substrate 1 is equivalent to a CF substrate of the traditional liquid crystal display. The second substrate 2 comprises gate lines, scan lines, thin film transistors but not limited thereto. The second substrate 2 is equivalent to a TFT substrate of the traditional liquid crystal display. Materials of the common electrode layer 12 and the pixel electrode layer 22 are both ITO. A material of the first passivation layer 11 and a material of the second passivation layer 21 are silicon nitride.

step 2, coating a glue frame on the first substrate 1 or the second substrate 2.

step 3, filling a liquid crystal layer 3 in a district surrounded by the glue frame.

Figure 8:
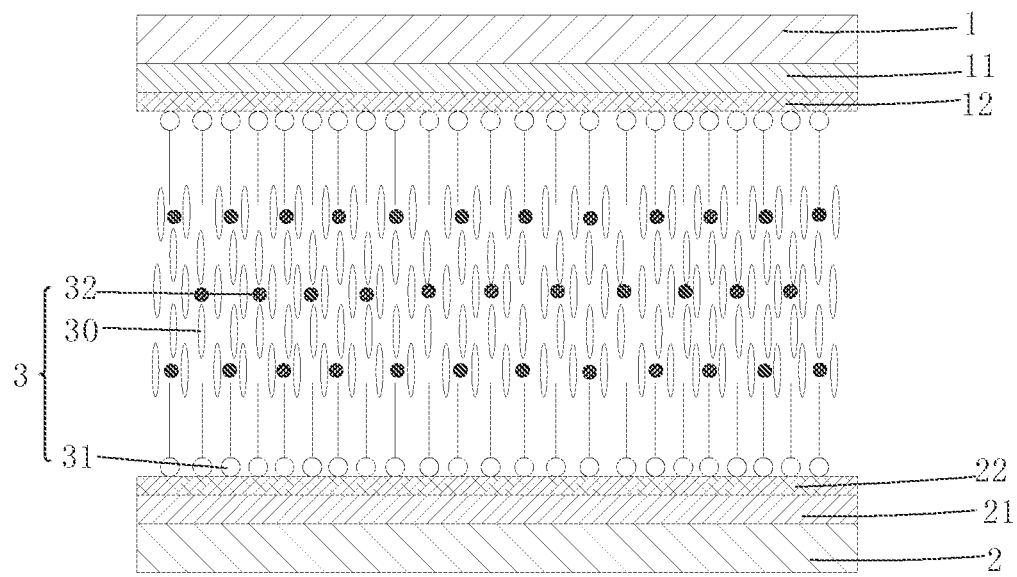
FIG. 8 is a view showing step 3 of the manufacture method of the vertical alignment liquid crystal display according to the present invention.

As shown in FIG. 8, the liquid crystal layer 3 comprises liquid crystal molecules 30, auxiliary alignment agent 31 and polymeric monomer 32 penetrating the entire liquid crystal layer 3 but not limited thereto. The liquid crystal molecules 30 are negative liquid crystal molecules.

A weight percentage of the polymeric monomer 32 in the liquid crystal layer 3 is 0.5%-8%, and preferably, the weight percentage of the polymeric monomer 32 in the liquid crystal layer 3 is 1%-5%. Specifically, the polymeric monomer comprises two or more compounds of methylacrylate, acrylate, epoxy group, vinyl, which comprises at least one double polymerizable group monomer and at least one polymeric group compound. A weight percentage of the polymeric group compound in the polymerizable monomer is 10%-50%.

The double polymerizable group monomer comprises two polymerizable groups, and the polymerizable group can be methylacrylate, acrylate, epoxy group or vinyl. The polymeric group compound comprises three or more polymerizable groups, and the polymerizable group can be methylacrylate, acrylate or epoxy group. The polymeric group compound comprises a plurality of polymerizable groups which can act as a crosslinking center in the polymerization for easily forming the polymer network 33.

Specifically, the double polymerizable group monomer comprises a constitutional formula of:

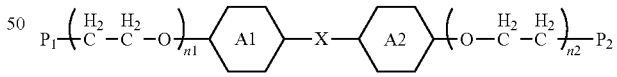

wherein P1 and P2 are polymeric groups, and the two can be the same or different, and selected from one of methylacrylate, acrylate, epoxy group, vinyl.

n1 and n2 are integers of 0-5, and the two can be the same or different.

A1 and A2 are hexatomic rings, and the two can be the same or different, and comprise substituent group or do not comprise substituent group, and can be benzene rings or cyclohexane.

X is linking group, which can be alkyl, ether, ester group chain that main chain contains 1-20 molecules replaced or not replaced, or hexatomic ring, which contains 1-5 of directly linked or spaced alkyl, ether, ester group of chain replaced or not replaced.

For instance, a constitutional formula of the double polymerizable group monomer can be:

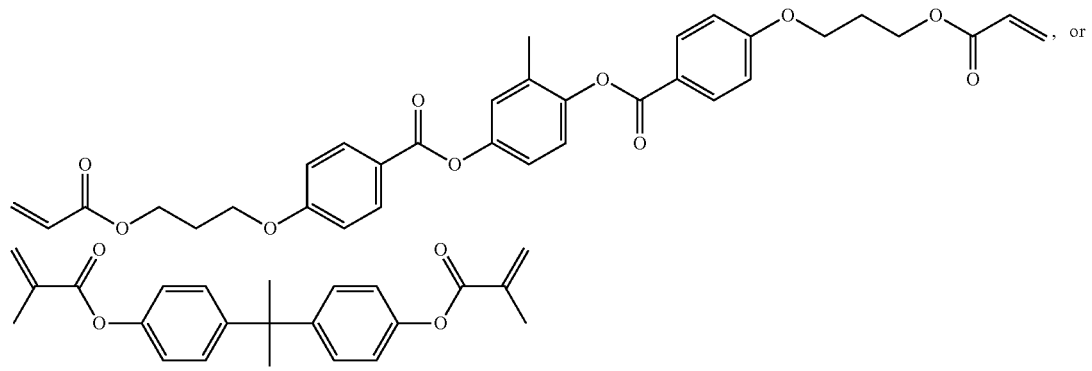

The polymeric group compound comprises a constitutional formula of:

$$Y\text{---}(L\text{---}P)_n,$$

wherein Y is kernel atom or group, capable of linking a plurality of substituent groups, and L is linking group, and P is polymeric group, and n is 3 or 4.

Y can be carbon atom, nitride atom, phosphate radical, multi ring group replaced or not replaced; L is alkyl, ether, ester group chain that main chain contains 1-20 molecules replaced or not replaced; P is selected from one of methylacrylate, acrylate, epoxy group, vinyl.

Figure 9:
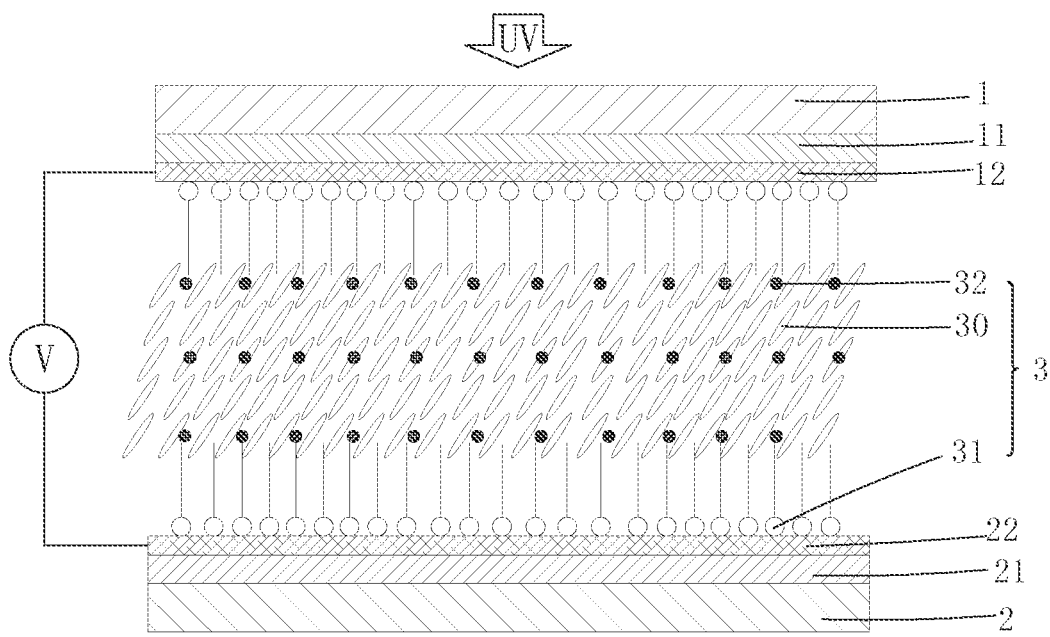
FIGS. 9 and 10 are views showing step 5 of the manufacture method of the vertical alignment liquid crystal display according to the present invention.

For instance, a specific constitutional formula of the polymeric group compound can be:

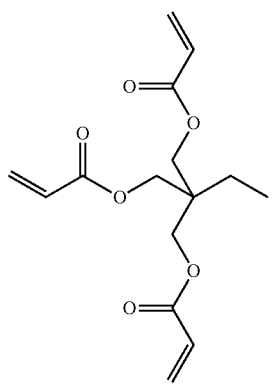

or:

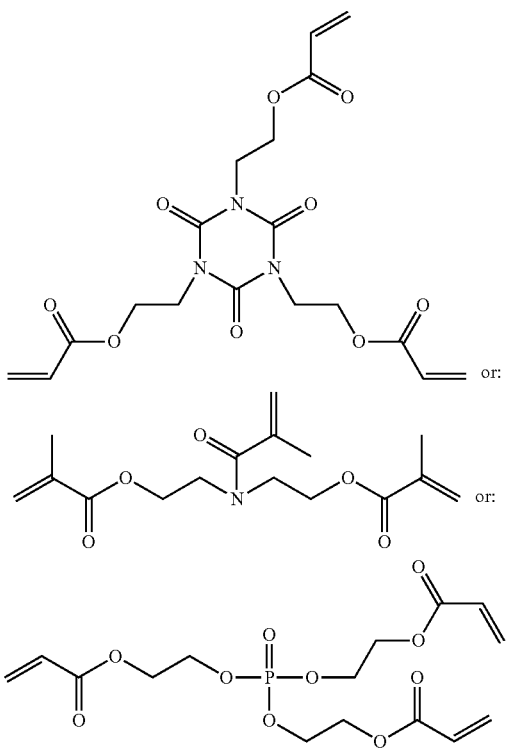

step 4, assembling the first substrate 1 and the second substrate 2.

step 5, as shown in FIG. 9, applying voltage to the common electrode layer 12 and the pixel electrode layer 22 to make the liquid crystal molecules 30 in the liquid crystal layer 3 twisted with a certain degree, and employing UV to irradiate the liquid crystal layer 3.

Figure 10:
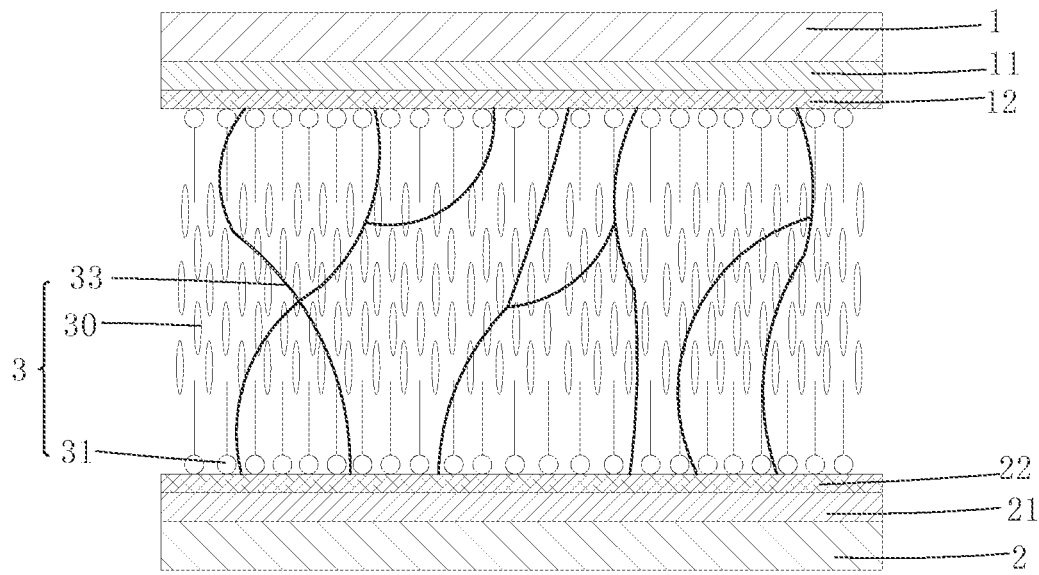

As shown in FIG. 10, the polymeric monomer 32 is occurred with polymerization to form a polymer network 33 penetrating the entire liquid crystal layer 3. The polymer network 33 has an extremely large surface area, and an extremely large contact areas with the liquid crystal molecules 30 to stabilize alignment of the liquid crystal molecules 30 and enhance vertical alignment effect of the auxiliary alignment agent 31 to the liquid crystal molecules 30.

Besides, in the manufacture method vertical alignment liquid crystal display of the present invention the PI alignment layer is not manufactured and saves consumption of the PI material and the investments for the related equipments of PI spray coating, baking. The tremendous consumed energy required in the PI pre-baking and high temperature post baking processes can be saved to prevent the damages to the environment and human body from the solvent evaporation in the PI processes.

In conclusion, in the vertical alignment liquid crystal display of the present invention, the liquid crystal layer comprises liquid crystal molecules, auxiliary alignment agent and a polymer network penetrating the entire liquid crystal layer, and with the auxiliary alignment agent, the vertical alignment of the liquid crystal molecules can be achieved. The polymer network has an extremely large surface area, and an extremely large contact area with the liquid crystal molecules to stabilize alignment of the liquid crystal molecules and enhance vertical alignment effect of the auxiliary alignment agent to the liquid crystal molecules. Thus, the weaker alignment ability issue of the small molecule auxiliary alignment agent can be solved to enhance the aligning force and the anchoring energy of the auxiliary alignment agent to the liquid crystal molecules and vertical alignment effect of the auxiliary alignment agent to the liquid crystal molecules; in the manufacture method of the vertical alignment liquid crystal display according to the present invention, by filling the liquid crystal layer comprising liquid crystal molecules, auxiliary alignment agent and polymeric monomer, and applying voltage to the liquid crystal layer with UV irradiation to induce polymerization of polymeric monomer, a polymer network penetrating the entire liquid crystal layer with a extremely large surface area is formed. The polymer network has an extremely large surface area, and an extremely large contact area with the liquid crystal molecules to stabilize alignment of the liquid crystal molecules. Thus, the weaker alignment ability issue of the small molecule auxiliary alignment agent can be solved to enhance the aligning force and the anchoring energy of the auxiliary alignment agent to the liquid crystal molecules and vertical alignment effect of the auxiliary alignment agent to the liquid crystal molecules. The method is more environmental protective and saves energy.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A vertical alignment liquid crystal display, comprising a first substrate, a second substrate oppositely located with the first substrate, a liquid crystal layer located between the first substrate and the second substrate, a first passivation layer and a second passivation layer respectively located at inner sides of the first substrate and the second substrate, and a common electrode layer and a pixel electrode layer respectively located on the first passivation layer and the second passivation layer;

wherein the liquid crystal layer comprises liquid crystal molecules, an auxiliary alignment agent and a polymer network penetrating the entire liquid crystal layer; the auxiliary alignment agent makes the liquid crystal molecules in the liquid crystal layer vertically aligned on the first substrate and the second substrate; the polymer network stabilizes alignment of the liquid crystal molecules and enhances the vertical alignment effect of the auxiliary alignment agent on the liquid crystal molecules;

wherein the polymer network is formed through polymerization of polymeric monomers, each of the polymeric monomers having at least two polymerizable groups;

wherein the polymeric monomers comprise at least one double polymerizable group monomer having two polymerizable groups and at least one polymeric group compound having at least three polymerizable groups; and a weight percentage of the polymeric group compound in the polymeric monomers is 10%-50%; and wherein a constitutional formula of the double polymerizable group monomer is:

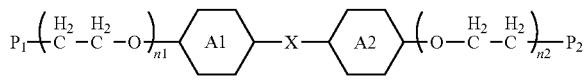

wherein P1 and P2 are polymerizable groups, which are the same or different and are each selected as one of methylacrylate, acrylate, epoxy group, and vinyl, n1 and n2 are integers between 0 and 5 and are the same or different, A1 and A2 are hexatomic rings, which are the same or different, each comprising or not comprising a substituent group, and which are each a benzene ring or cyclohexane, and X is a linking group, which is one of alkyl, ether, and ester groups of chains that have a main chain containing 1-20 molecules which are substituted or unsubstituted, or a hexatomic ring which contains 1-5 of directly linked or spaced alkyl, ether, and ester groups of chains which are substituted or unsubstituted;

wherein a constitutional formula of the polymeric group compound is:

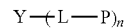

wherein Y is a kernel atom or group linking with a plurality of substituent groups, and which is one of a carbon atom, a nitride atom, a phosphate radical, and a multi ring group which is substituted or unsubstituted, L is a linking group, which is one of alkyl, ether, and ester groups of chains that have a main chain containing 1-20 molecules which are substituted or unsubstituted;

P is a polymerizable group, which is selected as one of methylacrylate, acrylate, epoxy group, and vinyl, and n is 3 or 4.

* * * * *